Dec. 5, 1933.  J. TELLER ET AL  1,938,470
GAS OR ELECTRIC COOKING APPARATUS
Filed Nov. 20, 1931  4 Sheets-Sheet 1

Inventors:
Jacob Teller,
Arthur P. Schulz,
By E. E. Mayer Atty.

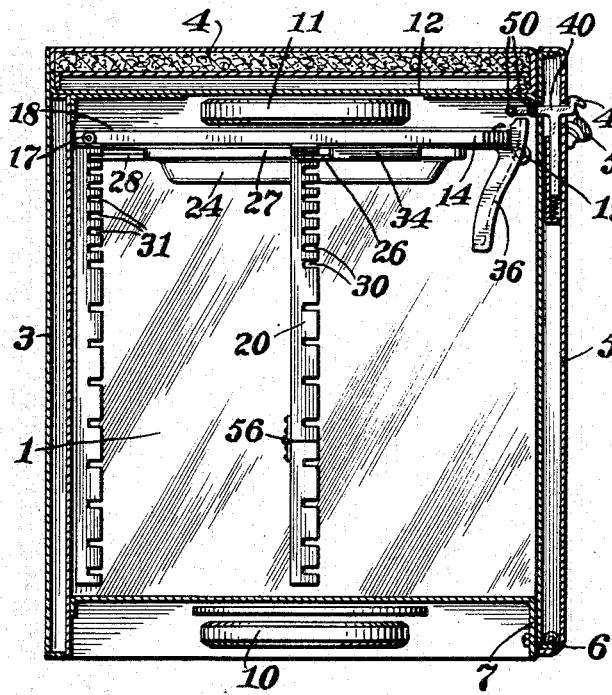
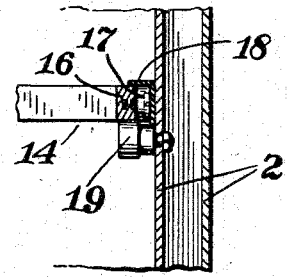
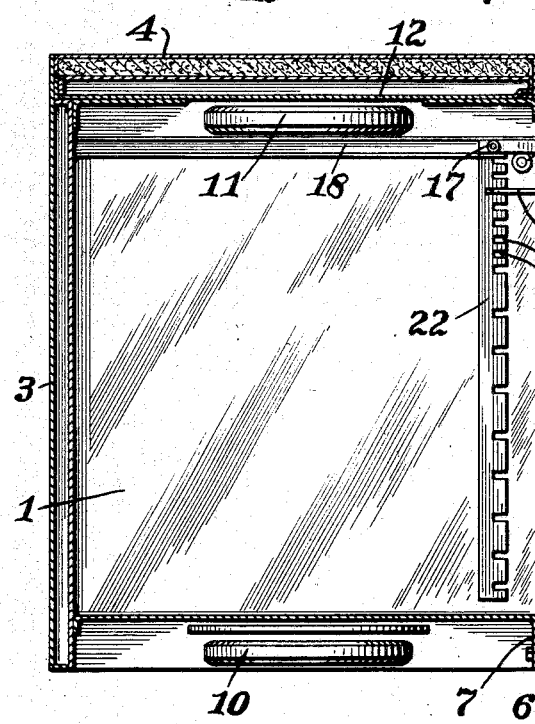

Dec. 5, 1933.  J. TELLER ET AL  1,938,470
GAS OR ELECTRIC COOKING APPARATUS
Filed Nov. 20, 1931  4 Sheets-Sheet 3
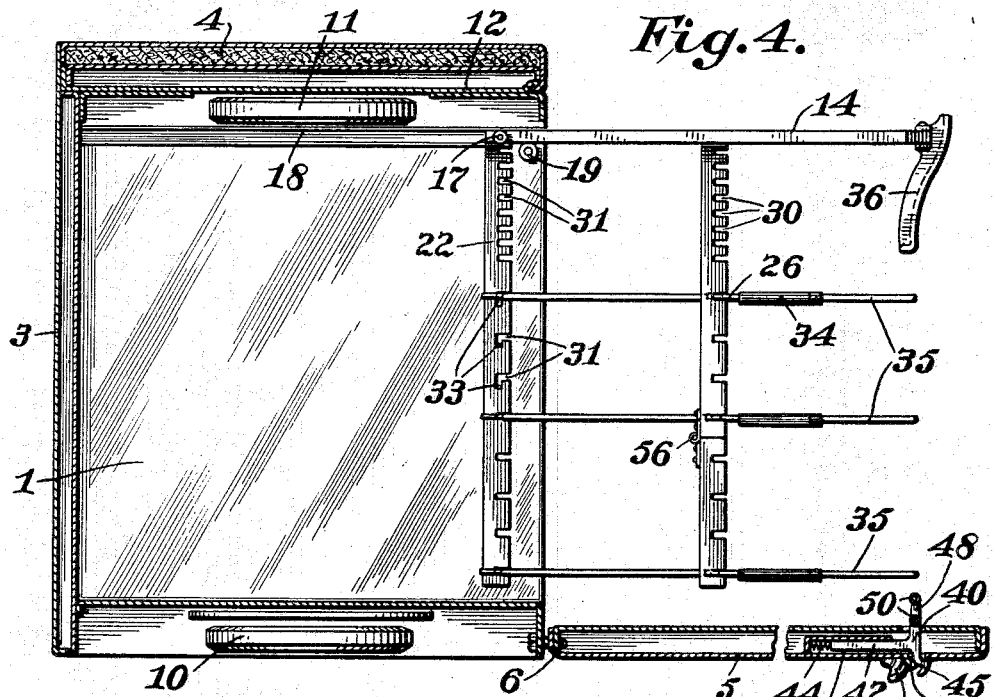

Dec. 5, 1933.  J. TELLER ET AL  1,938,470
GAS OR ELECTRIC COOKING APPARATUS
Filed Nov. 20, 1931   4 Sheets-Sheet 4
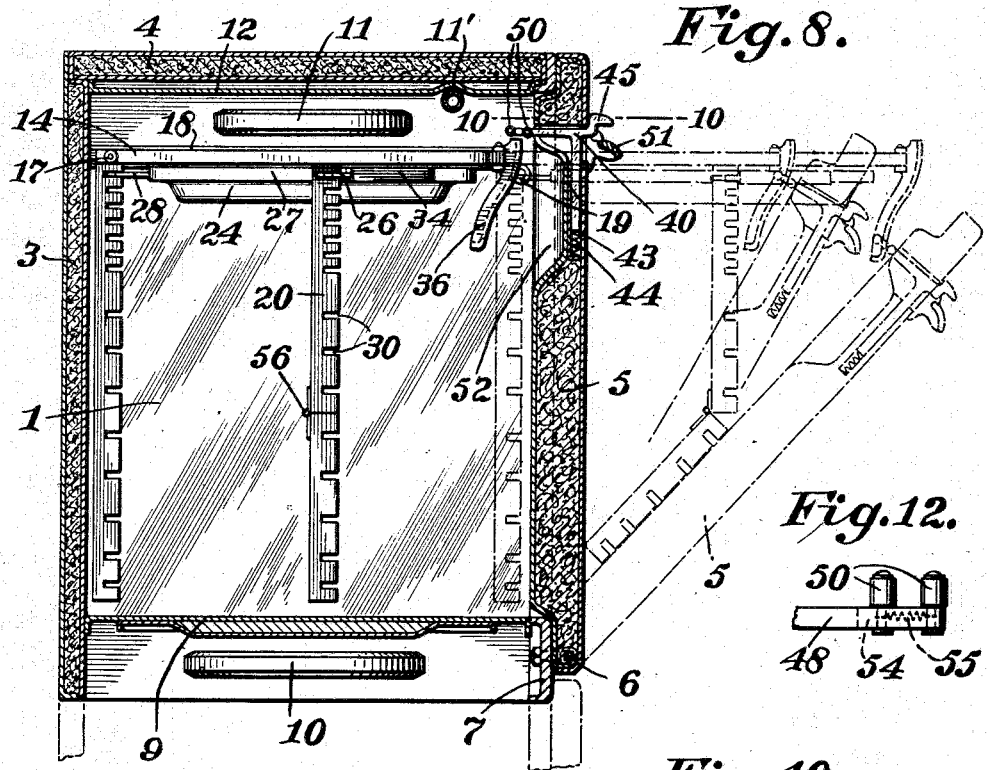
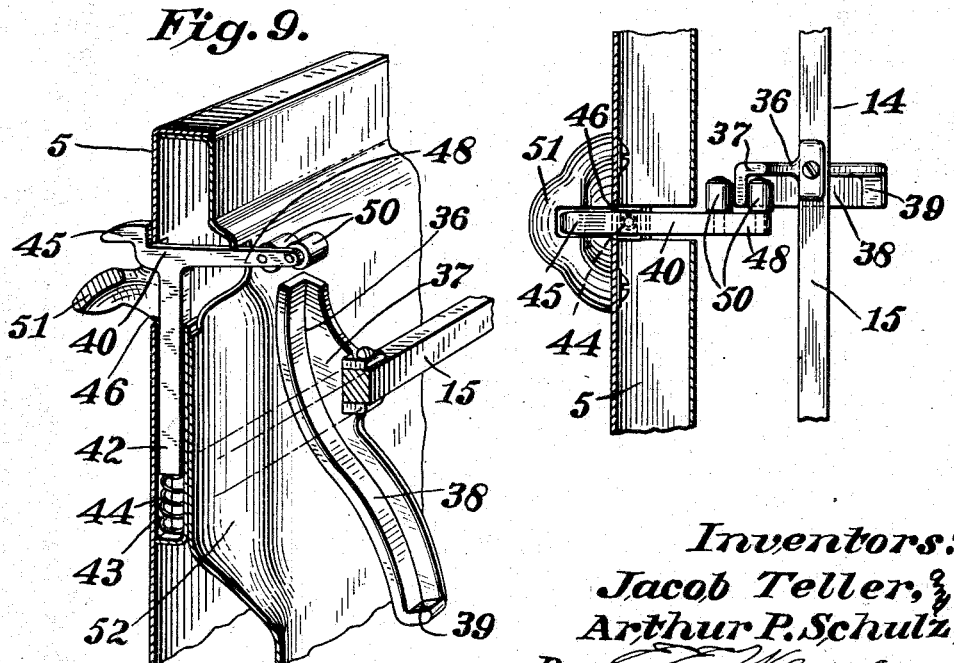
Inventors:
Jacob Teller,
Arthur P. Schulz,
By E. E. Wear
Atty.

Patented Dec. 5, 1933

1,938,470

UNITED STATES PATENT OFFICE 1,938,470

GAS OR ELECTRIC COOKING APPARATUS

Jacob Teller, New Rochelle, and Arthur P. Schulz, New York, N. Y., assignors to Teller Stove Designing Corporation, New York, N. Y., a corporation of New York Application November 20, 1931
Serial No. 576,412

5 Claims. (Cl. 126—340)

This invention relates to cooking apparatus, and particularly a combined baking oven and broiler construction, particularly adapted for use in what is today commonly known as low oven gas ranges, or table-top ranges.

It has been found in practice, that in the present table-top ranges, the broilers are much too low for ease of operation, necessitating the person using the broiler stooping and pulling out the broiler pan, and the present construction has been devised to overcome the many faults incident to the former practice, by embodying in a low oven range, a high broiler arrangement, combined with means for automatic movement of the broiler pan and its supporting device, in accordance with the movements of the door, such means being under the control of the operator to the extent that said means may or may not be brought into operation at will. Our construction therefore, replaces the former construction of divided oven and low broiler.

Our construction also embodies one form of broiler pan operating mechanism complemental to the oven door and pan rack, which has been found efficient to perform the function of operating said elements in unison or independently of one another as the operator desires, although other embodiments of the idea might be suggested to stove manufacturers or others familiar with stove and range practice, which would fall within the scope of our invention as set forth in the annexed claims.

A further feature resides in a bracket arrangement, carried by the broiler pan frame, whereby the broiler pan may be supported in varying spaced relation to the broiler burner, said bracket arrangement also permitting its use as a cooking utensil support when it is desired to employ the combined broiler and baking compartment as a baking oven alone.

These and many other features and advantages will appear to those familiar with the stove and range art.

In the accompanying drawings:

Fig. 2 is a vertical section through the range, with the door closed;

Fig. 3 is a similar view with the door open and broiler frame and pan extended;

Fig. 4 is a similar view showing the manner of use when the door is not employed for sliding the broiler frame outwardly, and whereby the oven may be used for ordinary baking purposes.

Fig. 5 is a top perspective view of the broiler pan;

Fig. 6 is a perspective view of one of the racks used in baking or other cooking;

Fig. 7 is a detail sectional view through the broiler frame or rack and its guide;

Fig. 8 is a vertical sectional view through the range and showing in dotted lines the various positions of the door and broiler pan frame when operated in unison;

Fig. 9 is a view, partly in section, and partly in perspective, showing the details of the operating means whereby the broiler pan supporting frame may be connected with the door for simultaneous operation;

Fig. 10 is a horizontal section of the structure shown in Fig. 9, substantially on the line 10—10 of Fig. 8;

Fig. 11 is a top perspective view of a modified form of securing plate on the broiler pan, and Fig. 12 is a view showing a modified form of the anti-friction rollers on the actuator on the oven door.

Figure 1:
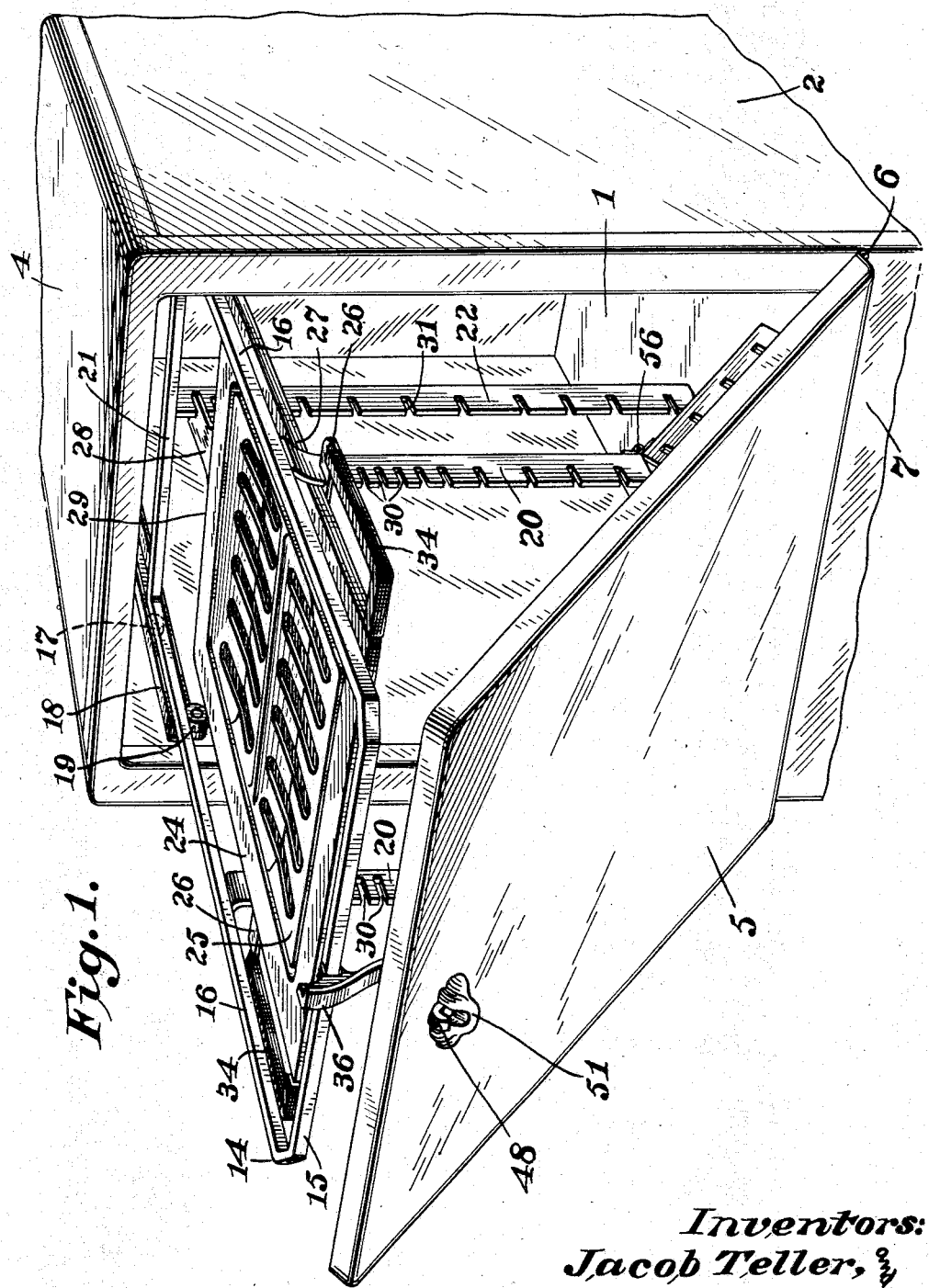
Fig. 1 is a front perspective view of a combined oven and broiler embodying the features of our invention, and showing the door open, and broiler and frame moved outwardly of its compartment.

With specific reference to the accompanying drawings, 1 indicates a compartment, constituting both the baking oven and the broiler compartment, and embodying side walls 2, a rear wall 3 and a top 4, all preferably insulated according to present stove and range practice. A door 5, hinged along its lower edge as at 6, to the lower frame member 7 of the compartment 1, and also suitably insulated, serves to close the front opening of said compartment.

Arranged below the floor 9 of the oven compartment, is a gas burner 10 of any approved construction, while a broiler burner 11 is suitably disposed in the upper portion of the compartment, preferably below a false top 12, spaced from the insulated top 4, said burners being connected with the gas supply manifold 11' in any desirable manner.

Since it is one of the principal objects of the present invention to provide means for supporting and moving a broiler pan and supporting mechanism, we provide a rectangular frame 14, including a front member 15, and lateral or side parallel members 16, the latter each having arranged on its side and toward the rear, an anti-friction roller bearing 17, located within a channel guideway 18 mounted upon the inner face of the side wall 2, said guideways also including a fixed roller 19 upon which the side members of the supporting frame 14 move during its sliding movements.

Rigidly secured to each of the side members 16 of the supporting frame 14, substantially intermediate its length, and depending therefrom, is a bracket 20, while the rear member 21 of the frame at its intermediate portion is provided with a similar depending bracket 22, which with brackets 20, constitutes a three point suspension means for the broiler pan 24, the latter having the removable meat or other food support 25.

The broiler pan, shown more clearly in detail in Fig. 5, is provided with means for supporting it upon the dependent brackets of the sliding frame 14, said means comprising oppositely disposed plates or lugs 26 formed on the side members 27 of the broiler pan 24, and a rear bifurcated plate or lug 28 centrally located on the rear member 29 of the broiler pan. These side lugs or plates 26 engage in recesses or slots 30 formed in the side suspended brackets 20 while the rear lug cooperates with a slot 31 in the rear suspended bracket 22. In Figure 11 is shown a modified form of the rear lug which, in the present instance, is provided with a downwardly turned lip 28' which hooks into a notch 33 formed as a downwardly turned extension of the several slots in the rear bracket 22. By this construction, the broiler pan is positively secured against accidental removal or displacement.

The side members of the broiler pan are each also provided with a handle or grip 34 by which it may be lifted out of the supporting racks 20—21 when necessary. Each of these brackets 20 and 22 is provided with a vertical series of these slots 31, so that the broiler pan may be supported at varying heights in the oven with respect to the broiler burner 11. By the arrangement shown, the racks 35 shown in Figure 6, may be also supported at varying heights in the oven, when the latter is used for baking or other cooking. In Figure 6, the rack 35 is provided with the side lugs or plates 26 and the rear lug or plate 28 as in the case of the broiler pan, and also includes the handles or grips 34.

One of the principal features of our invention resides in a mechanism whereby, when the door 5 is opened, the broiler pan support may be automatically moved outwardly with it, to bring the pan and its contents into a position wherein it is convenient for the operator to remove or examine the contents. To this end, we provide the means shown more in detail in Figures 8, 9, and 10 for performing this function.

The front member 15 of the rectangular frame 14 is provided with a substantially centrally located curvilinear guide bar 36. Specifically, this bar, which is in the form of a compound curve, suitable to operating the frame from the door movement, comprises an angle metal bar having a supporting web 37, and a trackway 38, at substantially right angles thereto, the trackway terminating at its lower extremity in a stop 39 which limits the movement of the door 5 and with it the rectangular frame 14, and thus preventing the frame being pulled entirely out of the oven through accident or carelessness.

The operating means which cooperates with the curvilinear guide bar for moving the frame 14 outwardly, comprises a reciprocatory actuator 40, including a plunger 42 mounted for sliding movement in a recess 43 in the oven door 5 and urged normally upwardly by a spring 44, a handle 45 for the actuator extending beyond the front face of the door 5 through a slot 46, and an inwardly extending arm 48 rigid with the plunger, and carrying upon its inner end, a pair of guide rollers 50 which may be caused to engage the curvilinear trackway when it is desired to move the broiler pan carrying-frame outwardly when the door is opened.

In Figure 8 we have illustrated several positions which the frame 14 and door 5 will assume when the means whereby they are operated in unison is connected. Following the operation from this figure, we will assume that the operator presses with his thumb downwardly upon the handle 45, at the same time, with the other finger or fingers grasping under the handle 51 for the oven door 5. This action causes the downward movement of the plunger, against the action of the spring, bringing the guide rollers 50 on the inner end of the arm into engagement with the trackway 38 of the curvilinear guide bar 36.

Now, with the pulling open of the oven door, the rollers 50 ride down the compound curved trackway, converting the outward and downward motion of the roller bearing arm into horizontal movement of the broiler pan carrying frame 14. Reverse movement of the door will result in the frame 14 moving inwardly into the oven to assume its initial position. When it is desired to open the door 5, without a resultant movement of the frame 14, the operator will not depress the handle 45 of the actuator, thus rendering the operating mechanism above described inoperative. The inner face of the door is provided with a recess 52 in proximity to the guide bar 36, for purposes of clearance for the lower end thereof when the door and frame 14 are actuated in unison. In Figure 12, we have shown a slight modification of the guide rollers, which in this instance are loosely mounted for sliding movement in slots 54, in the arm 48, and yieldingly held toward one another through the medium of a coiled spring 55, the purpose being to avoid binding of the rollers on the trackway through any irregularity of curvature thereof.

In Figure 8, we have shown the lower portion of the side broiler pan supporting brackets 20 hinged at 56 so that they will not interfere with the full opening of the door 5 when it is desired to have access to the broiler pan, yet will permit of the full use of said brackets, even to supporting the racks at substantially the lowest part thereof, when the compartment 1 is being employed as an oven in the usual manner of a baking oven, and not as a broiler. In the latter event, the actuator 40 on the oven door 5 will not be operated, and the frame 14 will not be moved outwardly with the swinging of the door.

What we claim as our invention is:

1. In a cooking range, an oven compartment, a burner arranged therein, a broiler pan support slidably mounted therein and having a curved guide bar at its forward and outer end, a broiler pan on said support, a door hingedly mounted on the said compartment to form the closure thereof, and means on said door for selectively engaging said guide bar, whereby when said door is opened, said support may be moved outwardly.

2. In a cooking range, a cooking compartment, a broiler burner supported therein, a front door frame for said compartment, said frame having a guide bar at its front extremity, a slidable frame supported within said cooking compartment, a trackway for said slidable frame, a door hinged to said compartment frame, and means on said door cooperating with said guide bar on said frame whereby when said door is opened, the frame is moved outwardly of the cooking compartment, 3. In a cooking range, a cooking compartment, a door frame for the front thereof, a broiler pan supporting frame slidably mounted within said compartment and having a curved guide bar at its front extremity, a door hinged to said frame, and means on said door for selectively engaging said pan frame whereby said door may be opened independently of the movement of said guide bar on said pan frame.

4. In a cooking range, a combined baking and broiling compartment, a burner therein, a broiler pan frame slidably supported within said compartment, said compartment having an opening with a frame therefor, a door mounted on said frame, a movable actuator on said door, and a curvilinear guide bar on said broiler pan frame at the front extremity thereof and selectively engageable with said actuator, for moving said frame in unison with the movements of the door.

5. In a cooking range, a combined baking and broiling compartment, a burner therein, a broiler pan frame slidably supported within said compartment, said compartment having an opening with a frame therefor, a door mounted on said frame at its forward end, a curvilinear guide bar on said frame, an actuator on said door capable of selective engagement with said guide bar, and means for moving said actuator into operative engagement with said guide bar at the will of the operator, whereby said broiler pan frame may be coupled to or disconnected from said door during its movement.

JACOB TELLER.
ARTHUR P. SCHULZ.